United States Patent Office 3,510,050
Patented May 5, 1970

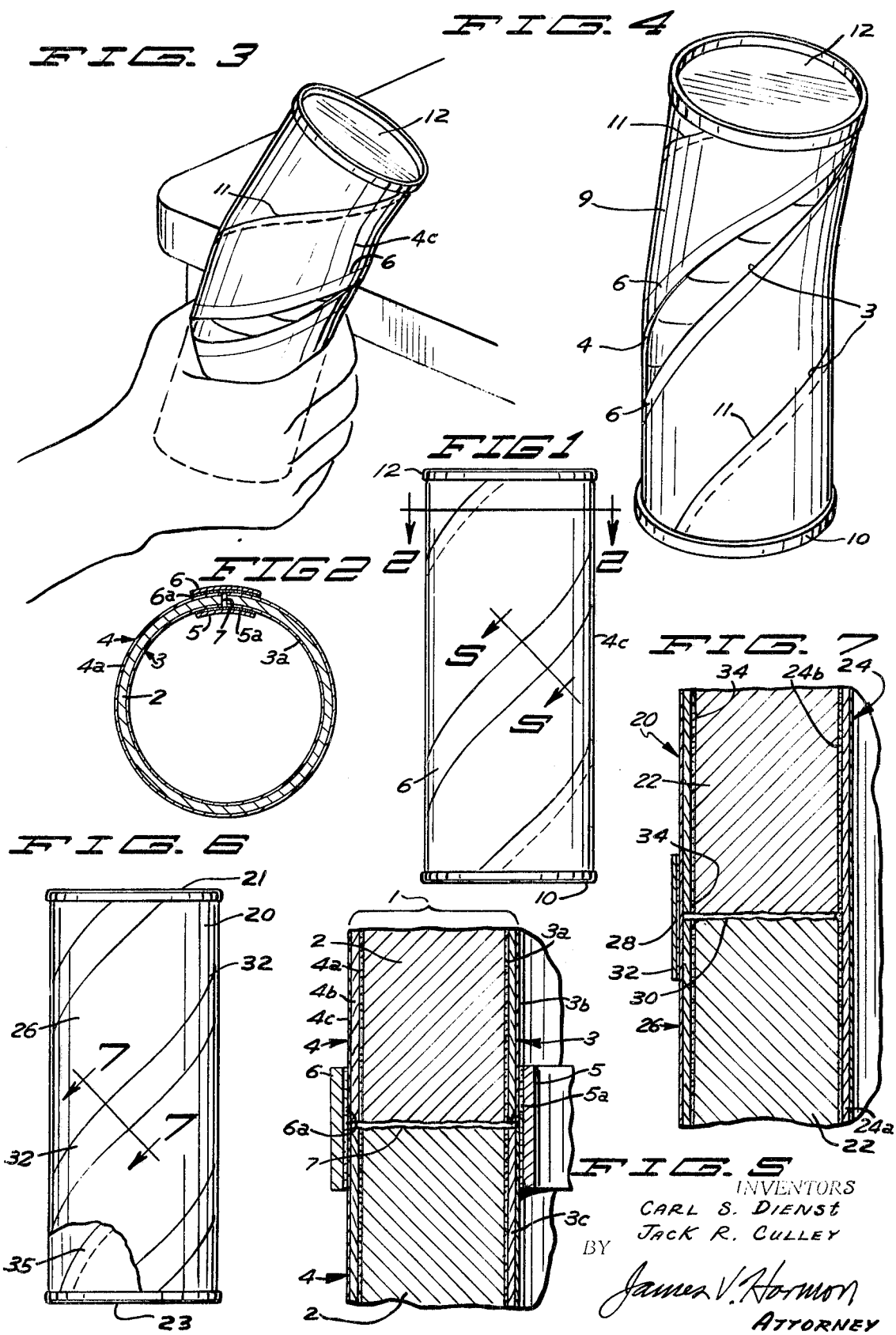

3,510,050
DIRECT OPENING LEAVENED DOUGH PACKAGE
Jack R. Culley and Carl S. Dienst, Minneapolis, Minn., assignors to The Pillsbury Company, Minneapolis, Minn., a corporation of Delaware
Filed Jan. 24, 1966, Ser. No. 522,448
Int. Cl. B65d *5/54;* B65b *25/16*
U.S. Cl. 229—51                                      10 Claims

ABSTRACT OF THE DISCLOSURE

A direct opening composite can composed of a fiberboard center layer including a longitudinally or helically disposed butt joint over which outer and inner tensile members are bonded by a hot metal adhesive. The stiffness of the container body is sufficient to concentrate the stress applied by impact with the edge of said solid object at the tensile members in the region of the butt joint but being insufficient to prevent said container body from bending when struck with moderate force and the combined strength of the tensile members allowing the tensile members to rupture when struck at a point located upon the butt joint with moderate force against the edge of said solid object.

---

The present invention relates to a package for leavened fresh dough of the type which produces a pressure within the package.

The packaging of leavened dough products begins by filling the containers with bodies of leavened dough which are substantially smaller in size than the diameter of the package. The dough is permited to proof and is subsequently refrigerated. These packages are kept under refrigeration while they are shipped as well as during storage in warehouses and retail outlets. The dough is under pressure within the package. The package must, therefore, be opened in such a manner that the pressure is dissipated almost instantly, for example, only a small opening is made in the package, internal pressure will cause the dough to extrude out and thus deform the dough pieces.

Opening packages of this type has been attended by a certain degree of inconvenience. While prior packages would successfully resist the internal pressure produced, several steps were required to accomplish the opening operation. In an attempt to overcome these difficulties, it has been proposed that the packages of the type described be opened in a single operation as will be described more fully below. On the other hand, in most prior containers used commercially an outer wrapper had to be removed before the container could be opened as illustrated for example by Pat. No. 2,793,126. In addition to the fact that packages of the latter construction require several steps to open, they sometimes open prematurely upon removal of the label or tear strip which is, of course, undesirable.

In addition to the requirements already mentioned for successful operation, the dough packages of the type described and of which the invention is concerned must exhibit substantial resistance to high levels of humidity that are normally encountered during refrigeration. Contact between ambient moisture and the packaging materials employed can substantially reduce the strength of these materials and, in particular, their resistancce to bursting due to the pressure exerted against the walls of the container by the contents thereof. In the packages of the type under consideration, resistance to internal pressure is due primarily to the paper or paper-base material present in the container. Paper is, of course, markedly affected by exposure to excessive moisture levels and even the best wet strength paper retains only about 40% of its dry strength after it has been exposed to high levels of moisture.

As mentioned briefly above, the direct opening of leavened dough cans has been previously proposed. A dough can of this type is described in U.S. Pat. No. 2,975,068. The dough can described therein consists of a spiral wound tube including a helical separation line or butt joint that is overlapped on its inner and outer surfaces by a liner and label respectively. This can be designed to be opened directly, i.e. without the removal of a tear strip or tab. Opening accomplished by striking the can against the corner of a table. Cans of this construction have been thoroughly evaluated for a substantial period of time and have been found by us to have certain marked defects. First, the opening of the can is accomplished with considerable difficulty. That is to say, a very substantial striking force is required to open the can. Moreover, these cans are difficult to open by striking upon anything other than a relatively sharp corner and they must be struck accurately against this corner at a pre-determined localized area of the can. Consumer research also indicates that the level of force required to open this type of can is excessive unless the corner open directions are followed. If the corner was used, the packages would open provided they were struck in the right location on the package. Often directions were not followed. Frequently, a corner of the type required for proper opening was not available. As a result, striking the can against a corner on a pre-determined localized area was found undesirable by the consumer.

In an attempt to overcome the difficulties associated with cans of the type described in the above-mentioned patent, the liner, label and core were constructed of lighter weight materials in an attempt to allow them to open more easily. These attempts were unsuccessful, however, because it was found that when the container was light enough in construction to open easily, the cans had a decided tendency to open prematurely during shipment.

In view of the above-mentioned deficiencies of the prior art, one object of the present invention is to provide an improved package of the type described which will successfully resist pressure generated during shipment and storage but will open reliably when struck with moderate force against a straight edge as for example the side edge of a table or counter and will exhibit greater latitude than heretofore with regard to which part of the can must be struck for proper opening.

Another object of the invention is the povision of an improved package for refrigerated dough which will retain its strength under long-term, high humidity storage conditions encountered in refrigerated storage and can, at the same time, be opened in a single step.

Yet another object of the invention is the provision of an improved direct opening dough package of the type described having a joint which extends generally longitudinally of the container body and includes a reliable means for concentrating the stresses at the joint area when the can is struck to prevent dissipation of the applied forces over a substantial portion of the container wall.

Still another object of the present invention is the provision of an improved dough package which will reliably resist premature opening but which requires no preparatory step or treatment prior to being opened and can be reliably opened by being struck with moderate force against the edge of a solid object.

Still another object of the present invention is the provision of an improved tubular dough package having a cylindrical container body including a generally longitudinally extending butt joint and a reliable provision to prevent adhesive applied adjacent to the butt joint from inadvertently penetrating into th space between the adjacent edges of the joint.

These and other more detailed and specific objects will be apparent from the following specification and accompanying figures wherein:

FIG. 1 is a side elevational view of the package in accordance with the inventon.

FIG. 2 is a transverse sectional view taken on line 2—2 of FIG. 1.

FIG. 3 is a perspective view illustrating the opening of a package embodying the invention.

FIG. 4 is a perspective view showing the appearance of the package immediately after is has been opened.

FIG. 5 is a transverse sectional view taken on line 5—5 of FIG. 1.

FIG. 6 is a side elevational view of another embodiment of the invention.

FIG. 7 is a transverse sectional view taken on line 7—7 of FIG. 6.

The invention will now be briefly described. The packages embodying the present invention include an elongated container body which will ordinarily be cylindrical but in any case having a circular configuration at all points on the longitudinal axis thereof. The container body is composed of one or more layers and preferably includes a central stiffening core member. The container body is provided with a butt joint that extends generally longitudinally of the core. An inner protective layer which in most instances comprises a layer of flexible sheet material is positioned adjacent to the inner wall of the core to prevent the loss of moisture, oil and gas from the can. An outer protective layer is positioned adjacent to the outer surface of the core to prevent ambient moisture from harming the container body. Inner and outer frangible tensile members bridge the butt joint and are adhered to the marginal edges of the container body adjacent to the butt joint by means of a holt melt adhesive. The tensile members may extend over the entire inner and outer surfaces of the container body but must cover at least the portion of the container body adjacent the butt joint. After the container is filled, a cover is secured to each end. In the course of developing the invention, it was found that a hot melt adhesive of the type described below had three highly important and beneficial effects. First, it prevents moisture from penetrating the core material and thereby altering the properties thereof, particularly its stiffness or resistance to bending. Secondly, adhesives of the type described can be applied to the core or to the tensile members with a high degree of accuracy and undesired spreading or penetration of the adhesive as for example inadvertantly into the butt joint or between the edges of the butt is reliably prevented. Finally, adhesives of the type described provide the possibility of a very strong tenacious adhesive bond between the extreme edges of the core material adjacent to the butt joint and the overlapping frangible tensile members. This bond hereinafter will be referred to as a tenacious bond. By "tenacious bond" is meant a form a adhesion in which one of the substrate materials being adhered will fail before the adhesive itself ruptures. For proper operation, two additional factors must be provided in producing cans in accordance with the invention. First, the stiffness of the body stock must be properly selected to provide suitable bending or yielding of the container wall when the can is struck against an edge. Secondly, the rupture strength of the tensile members must be properly controlled to permit breakage of the tensile members when the tensile members are subjected to moderate impact by striking the butt joint of the container against the edge of a solid object.

Refer now to the figures and in particular the FIGURES 1–5 which illustrate one form of can embodying the present invention by way of example. Like many prior containers of the type described, the container or can of the present invention includes an elongated container body which will ordinarily be cylindrical in configuration. The term "can" designates a relatively lightweight package usually a consumer package made of metal or paperboard or a combination of both. It can, however, have a somewhat different shape such as frusto conical. In any event, the container has a circular configuration as seen in cross section at any point on the longitudinal axis thereof. As seen in FIGS. 2 and 5, the container body 1 (FIG. 5) includes a core or stiffening member 2 to provide shape, stiffness and overall strength plus an inner protective coating layer 3 to protect the core from the effects of the packaged product including oil, shortening and water and also helps to prevent the loss of leavening gas and moisture to the atmosphere. The inner coating layer preferably comprises a layer of flexible sheet material positioned adjacent to the core 2 and is preferably bonded as by means of adhesive to at least a portion of the core. Positioned adjacent to the outer surface of the core 2 is an outer protective coating layer 4 for the purpose of protecting the packaging materials from moisture found in refrigerated storage conditions. The protective coating layer 4 also assists in preventing the loss of leavening gas and moisture from the dough.

As will be best seen by reference to FIG. 5, both the inner and outer protective layers can be composed of a composite sheet material, for example, a laminate composed of kraft paper 4b and aluminum fail 4c. As clearly seen in the figure, the aluminum foil 4c is substantially thinner than the kraft paper layer 4b. The inner protective layer 3 includes adhesively bonded layers 3b and kraft paper 3c. The aluminum foil layer 3b of the protective coating layer 3 faces the interior of the can and the aluminum foil layer 4c of the outer protective coating 4 faces the exterior of the can. Also, as clearly shown in FIG. 5 the inner coating layer 3 is secured to the core 2 by means of a bonding adhesive 3a. The outer protectice coating layer 4 is secured to the outer surface of the core 2 by means of a suitable adhesive layer 4a. The adhesive layers 3a and 4a can be employed to bond the coating layers to the core 2 over the entire surface of the core but at least in the area adjacent to the butt joint 7 which will be described more fully below.

Refer now particularly to FIGS. 1, 2 and 5. As can be clearly seen, there is provided in the core 2 and extending through the inner and outer protective layers 3 and 4 (which together compose the container body 1), a butt joint 7 which is oriented in a generally longitudinal direction with respect to the major axis of the can. In the specific form of the invention illustrated, the butt joint 7 extends helically. While the edges of the core adjacent to the butt joint 7 have been spaced slightly for purposes of illustration in FIG. 2, in practice they are either abutting or almost in contact as clearly shown in FIG. 5.

Inner and outer tensile members 5 and 6 respectively are bonded in positions bridging the butt joint 7 by the provision of adhesive layers 5a and 6a between the surfaces of thecontainer body and tensile members as clearly shown in FIGS. 2 and 5. In this instance, the inner and outer tensile members 5 and 6 comprise relatively narrow tape members. As described briefly above, the tensile members 5 and 6 can, if desired, extend over the entire inner and outer surfaces respectively of the container body. Adhesive layers 5a and 6a have special requirements in accordancewith the invention. They are formed from hot melt adhesives. By the term "hot melt" adhesive is meant a material composed of one or more resins or waxes or both in combination which is liquified by heat to produce adhesion or a solvent-free resinous adhesive which is hardened by the presence of heat. In accordance with the invention, three important advantages are provided by the hot melt adhesive layers 5a and 6a. The first is that the adhesive of the type described prevents moisture or other solvent from penetrating the core material 2 which, if allowed to take place, could affect the strength and stiffness of the core. It has been found in practice that the penetration of moisture into the core material not only weakens the core but has a tendency to make it more elastic, resilient and yielding. Because the protective coating layers 3 and 4 are essentially moisture barriers, once moisture is allowed to penetrate the core material 2, it will tend to remain entrapped. Moreover, in the case of moisture containing adhesives such as animal glue, the percentage of moisture present will vary from time to time and accordingly, the stiffness of the core material will also vary.

Secondly, the adhesive of the type described can be accurately applied and can be confined to the area where its application is desired. In particular inadvertant penetration of the adhesive from layers 5a and 6a into the butt joint 7 can be reliably prevented.

A third advantage made possible by the use of the hot melt adhesive layers 5a and 6a is the possibility of obtaining tenacious adhesion as described above between the extreme edges of the container body adjacent to the butt joint 7 and then tensile members 5 and 6.

The composition of the adhesive layers 5a and 6a will now be described. As suggested above, the layers 5a and 6a are composed of hot melt adhesives. Regardless of which specific adhesive of the type defined above is selected, it should not have such a low viscosity that it penetrates the entire thickness of the core material 2 during application or inadvertantly penetrates the area between the edges of the butt joint 7. It should also be characterized by the ability to harden in a relatively short period of time. In any event, the adhesives employed in accordance with the present invention depend upon chemical or physical changes in order to make the transition from the liquid to the solid state rather than the loss of a solvent. Although some degree of penetration of the adhesive layers 5a and 6a into the container body will frequently take place, such penetration is not essential so long as a tenacious bond is obtained.

Characteristics of the core material 2 will now be described. In general, the thickness of the body stock core material 2 can vary considerably. A more important consideration is the stiffness of the core material. A characteristic of the core 2 in accordance with the invention is that it is flexible enough to bend when the can is struck against an edge. On the other hand, it should be stiff enough to concentrate the impact force in the area of the butt joint 7. With regard to thickness, it can, however, be said that in the event that commercially available paper-can grade paperboard is employed, the desired results can be obtained with paperboard from .012 to about .026 inches in thickness and within this range good results can be obtained in the range of from .014 to .022 inches in thickness. Containers formed from a core 2 composed of paperboard having a thickness of .016 inches has, for example, proved satisfactory. As suggested above, the stiffness of the core 2 is regarded as being the most important characteristic of the core for obtaining proper operation. The stiffness of the core member 2 of the type described above for a commercially available paperboard of the type used for winding fiber cans was found suitable when between about 180 and 350 Tabor stiffness units in the machine direction and between about 70 and 160 Tabor stiffness units in the cross machine direction. It should be understood that the above-mentioned stiffness values and thicknesses apply only in connection with the specific materials mentioned and are set forth by way of example only.

The rupture strength of the stress elements 5 and 6 should have the following characteristics: First, it should permit the can to open when it is struck against an edge with moderate force. On the other hand, it should not be of such a weak material as to permit the cans to open during normal shipment and handling and should not permit an excessive number of cans to open when dropped from a height of from 3 to 4 feet against a hard surface. By way of example, the stress elements 5 and 6 when formed from materials such as a laminate composed of aluminum foil and kraft paper should have a combined rupture strength of from about 18 to 32 pounds per inch.

The production of cans in accordance with the invention will now be described by way of example. One method consists of providing strips of core material 2 having a width of approximately 4 inches to which are laminated the protective coating layers 3 and 4 on the inner and outer surfaces respectively. These strips are fed to a can winding mandrel conventionally to provide a tube in which the core 2 is wound in the form of a spiral. The tapes 5 and 6 are previously coated with hot melt adhesive layers 5a and 6a, respectively, and are applied during the winding operation over the butt joint 7 and adhered to the container body by the application of heat. In most instances, the tapes 5 and 6 should be heated prior to application. In the course of the tube winding operation, a moving belt frictionally engages the several layers of the container body and causes them to be wound over the mandrel. The resulting tubular container body is subsequently cut at longitudinally spaced locations. A bottom cover 10 is then applied and seamed to the lower end of the can. After the biscuits are inserted, a cover 12 as seen in FIGS. 1 and 4 is applied conventionally and seamed. The packages can then be proofed for a sufficient period of time to cause the dough bodies to completely fill the containers. They are then refrigerated and transported to retail sales outlets.

When the package in accordance with the invention is used, it is removed from refrigeration, grasped manually and as shown in FIG. 3, it is struck with moderate force against the edge of a table at any point along the butt joint. By "moderate force" is meant a reasonable force customarily employed by persons opening containers of the general class described. Because of the reinforcing character of the covers, it is impractical to strike it within about ¾ inch from either end. The striking force will cause the body of the container to bend placing the stress elements 5 and 6 under tension immediately adjacent to the butt joint 7. These localized stresses in the elements 5 and 6 cause the stress elements to rupture in the area adjacent to the joint 7, thereby allowing the package to open as clearly shown in FIGS. 3 and 4. The package can then be twisted to open it slightly further so that the dough bodies can be easily removed.

Refer now to FIGS. 6 and 7 which illustrate another form of the invention generally similar to the form of the invention described in FIGS. 1–5 but includes only one tape member. The package of FIGS. 6 and 7 comprises a cylindrical container body having a tubular wall 20 consisting of a core 22 having inner and outer protective coating layers designated 24 and 26, respectively which are in al respects similar to the inner and outer layers 3 and 4 of the container shown in FIGS. 1–5. The butt joint 30, however, does not extend through the inside protective coating 24; i.e., there is no gap in the inside protective coating 24 abjacent to the butt joint 30. In this instance the coating 24 comprises an inner stress element. The coating 24 is composed of aluminum foil adhered to kraft paper 24a which is bonded to the core 22 by means of an adhesive layer 24b. The outer protective layer 26 is composed of the same material as coating 24 and is adhered to the core 22 by means of an adhesive layer 34. Tenaciously bonded over outer protective layer 26 by means of an adhesive layer 28 is a tape 32. The adhesive layer 28 has the same characteristics as the adhesive layer 6a shown in FIG. 5. The tape 32 bridges the butt joint 30 and comprises an outer stress element having the same composition as the stress element 6.

The invention will be better understood by reference to the following examples.

EXAMPLE I

A container was made similar to the embodiment illustrated in FIGS. 6 and 7 upon a conventional tube winding equipment. The container consisted of a core or body stock comprising paperboard having a thickness of 0.26 inch having a liner laminated to the interior of the core comprising kraft paper of 25 lbs. per ream and laminated to .00035 inch aluminum foil, having an overlap seam located out of register with the core butt joint and a label adhered to the outside of the core comprising kraft paper having a weight of 30 lbs. per ream laminated with .00030 inch aluminum foil. The label was wound to form a butt joint in exact alignment with the butt joint 30 of the core. A frangible element comprising a tape consisting of .002 inch aluminum foil having a vinyl heat seal lacquer was heat sealed over the butt joint 30. The tape was ⅞ inch in width. The tube was filled with dough and the ends of the tube thus were capped conventionally as described in the specification.

The can were proofed, cooled and stored at 40° F. and opened three days later and were found to open easily when rapped against an edge.

EXAMPLE II

Cans were made up as in Example I except that the tape comprised 35F/12T/35F and having a No. 540 heat seal coating obtained from Alcoa. These cans were also proofed and stored for three days at 40° F. Each can remained intact and opened easily upon being rapped against an edge.

EXAMPLE III

Another group of cans was made as in Examples I and II, but the tape consisted of an aluminum foil base heat sealing tape which is designated as tape 9012 by the Alcoa Company of Pittsburgh, Pa. These cans also opened easily upon being rapped against an edge.

EXAMPLE IV

Spiral wound cans were produced having the construction described in connection with FIGS. 1–5 on a conventional tube winding mandrel. The container wall consisted of a core formed from a 4 inch wide strip of .016 inch paperboard laminated on both sides with .00035 inch thick aluminum foil. The frangible elements consisted of a pair of identical tapes, each composed of 2 mil aluminum foil plus a vinyl heat seal coating, the tape being approximately ¾ inch wide. The tape of the type employed is made commercially available by the Alcoa Company of Pittsburgh, Pa. As the core, liner and label were being wound on the mandrel to form a tube, the heat sealing tape was preheated with a hot plate and a propane gas burner. An electric hot air heater was also employed for sealing the tapes to the body of the container. Each of the cans was packed with 237 grams of biscuit dough of the type including a chemical leavening agent. The cans were placed in storage at 40° F. for two months. They were then opened by striking them against an edge and were found to satisfactorily open with a moderate impact force.

EXAMPLE V

Spiral wound cans were produced having a construction generally similar to that shown in FIGS. 6 and 7 on a conventional tube winding mandrel. The container wall consisted of a core formed from a 4 inch wide strip of .026 inch thick paperboard, a liner composed of 25 lb. kraft laminated to .00035 inch foil, a label composed of 60 lb. kraft laminated with .00030 inch foil and a frangible tape made of .002 inch aluminum foil with a vinyl heat seal coating. The liner was adherred to the core with an overlap joint out of register with the core butt joint; the tape was heat sealed to the outer surface of the core as described in Example IV and bridged the butt joint and the label was adherred to the outer surface of the core and wound with the edge of the label butt joint in register with the core butt joint. Package was filled and evaluated as in Example IV and found to be satisfactory.

It is apparent that many modifications and variations of this invention as hereinbefore set forth may be without departing from the spirit and scope thereof. The specific embodiments described are given by way of example only and the invention is limited only by the terms of the appended claims.

I claim:

1. An elongated direct opening composite can having a circular configuration at all points along the longitudinal axis thereof for packaging leavened fresh dough products and adapted to open when struck against the edge of a solid object, said can comprising a container body including a stiffening means and being adapted to prevent the passage of liquids and gas therethrough, said container body having a butt joint extending generally longitudinally thereof, inner and outer tensile members formed from sheet material and positioned adjacent to the inner and outer surfaces of the container body respectivey, each of the tensile members being positioned to bridge said butt joint and covering at least the portions of the container body adjacent to the butt joint, an adhesive bonding agent between at least the surface of the container body at the edge of the butt joint and each of the tensile members, at least one of said adhesive bonding agent being composed of a hot melt thermoplastic adhesive, said hot melt adhesive providing a tenacious bond between the edge of the container body and the adjacent tensile member, the stiffness of the container body being sufficient to concentrate the stress applied by impact with the edge of said solid object at the tensile members in the region of the butt joint but being insufficient to prevent said container body from bending when struck with moderate force and the combined strength of the tensile members allowing the tensile members to rupture when struck at a point located upon the butt joint with moderate force against the edge of said solid object, said container body comprising paperboard having a stiffness between about 180 and 350 Tabor units in the machine direction and 70 to 160 Tabor units in the cross machine direction.

2. The container of claim 1 wherein the container body is a tube having a constant diameter.

3. The container of claim 1 wherein said container body includes a central core composed of paperboard having a thickness of from about .012 to .026 inch in thickness.

4. The container of claim 1 wherein the inner tensile member covers the entire inner surface of the container body.

5. The container according to claim 1 wherein the outer tensile member comprises a tape.

6. The container of claim 1 wherein the outer tensile member is a metal foil and said hot melt adhesive bonding said outer tensile member to said container body is a thin layer formed from a thermoplastic resinous material.

7. The container according to claim 1 wherein tensile members are flexible sheet material having a combined rupture strength between about 18 to 32 lbs./inch width.

8. The container of claim 1 wherein said container body includes a core member formed from a helically wound strip of paperboard to form a tube having a constant diameter, said butt joint being defined by the edges of said strip, an inner protective layer bonded to the inward surface of the core composed of aluminum foil bonded to kraft paper and said outer tensile member comprises a narrow tape composed of flexible sheet material.

9. The combination of claim 1 wherein the inner and outer tensile members each comprises tape members and said inner and outer tensile members are both tenaciously bonded to the margins of the container body adjacent the butt joint.

10. The combination of claim 1 wherein the container body is a tube having a constant diameter including a core composed of paperboard having said butt joint extending helically thereof, said inner tensile member comprises a layer of sheet material covering the entire inner surface of the core and said outer tensile member comprises a flexible sheet bonded to the container body with a hot melt adhesive composed of a thin layer of a thermoplastic resinous material.

References Cited

UNITED STATES PATENTS

| 2,975,068 | 3/1961 | Fienup et al. | |
| 3,101,885 | 8/1963 | Walsh | 229—51 |
| 3,147,902 | 9/1964 | Miller | 229—4.5 |
| 3,159,515 | 12/1964 | Dunlap et al. | 229—4.5 X |
| 3,162,347 | 12/1964 | Taylor | 229—4.5 |
| 3,274,905 | 9/1966 | Demsey et al. | 229—4.5 X |
| 3,288,341 | 11/1966 | Krause | 229—4.5 |

DAVIS T. MOORHEAD, Primary Examiner

U.S. Cl. X.R.
93—94; 99—172